United States Patent [19]

McDowall et al.

[11] Patent Number: 4,547,939
[45] Date of Patent: Oct. 22, 1985

[54] SECONDARY BATTERIES

[76] Inventors: William L. McDowall, 38 Belinda Ct., Glen Waverley, Victoria; Alan K. Maplesden, 3/60 Peel St., Kew, Victoria, both of Australia

[21] Appl. No.: 599,222

[22] PCT Filed: Dec. 8, 1981

[86] PCT No.: PCT/AU81/00187
§ 371 Date: Aug. 9, 1982
§ 102(e) Date: Aug. 9, 1982

[87] PCT Pub. No.: WO82/02118
PCT Pub. Date: Jun. 24, 1982

Related U.S. Application Data

[62] Division of Ser. No. 414,359, Aug. 9, 1982, abandoned.

[30] Foreign Application Priority Data

Dec. 9, 1980 [AU] Australia .............................. PE 6844

[51] Int. Cl.⁴ ............................................. B23P 13/00
[52] U.S. Cl. ........................................... 29/2; 29/730
[58] Field of Search ...................... 29/2, 623.1, 623.5, 29/730; 140/107; 72/196; 429/241, 242, 243, 244, 149

[56] References Cited

U.S. PATENT DOCUMENTS

| | | | |
|---|---|---|---|
| 2,634,304 | 4/1953 | Stoertz | 429/243 X |
| 2,833,846 | 5/1958 | Wheat | 429/243 X |
| 3,738,871 | 6/1973 | Scholle | 429/241 |
| 4,105,835 | 8/1978 | Sugalski | 429/241 X |
| 4,118,553 | 10/1978 | Buchethal et al. | 429/241 X |
| 4,134,192 | 1/1979 | Parkinson et al. | 29/2 |
| 4,151,331 | 4/1979 | Hug et al. | 429/243 |
| 4,160,309 | 7/1979 | Scholle | 29/2 |
| 4,237,205 | 12/1980 | Matter | 429/241 |
| 4,247,970 | 2/1981 | Bollinger | 29/2 |
| 4,319,473 | 3/1982 | Franke, Jr. et al. | 72/196 |

Primary Examiner—Howard N. Goldberg
Assistant Examiner—P. W. Echols
Attorney, Agent, or Firm—Banner, Birch, McKie & Beckett

[57] ABSTRACT

A plate for a multi-cell secondary battery incorporating a moulded perimeter frame (10) of thermoplastic material with a metal mesh (18) spanning the area of the frame (10) to provide support for battery paste material. The metal mesh (18) having at least a portion thereof formed into a plurality of corrugations (16) after the frame (10) has been moulded in-situ about the margin of the mesh (18). The forming of the corrugation (16) removing any buckling or distortion of the mesh (18) arising from the moulding of the frame (10).

4 Claims, 3 Drawing Figures

SECONDARY BATTERIES

This application is a division of application Ser. No. 414,359, filed Aug. 9, 1982, now abandoned.

This invention relates to a plate for a secondary battery and to a method of manufacturing same.

It has been proposed to construct a plate for a multicell secondary battery incorporating a perimeter frame of thermoplastic material with a metal mesh spanning the area of the frame to provide support for the active battery paste. It is convenient when manufacturing such a plate for the mesh to also act as a current collector for that particular plate. It has been proposed to produce the frame and mesh assembly by moulding the plastic material of the frame insitu around the perimeter of, or part of the perimeter of the mesh.

In producing such an assembly problems have arisen due to the thermal contraction of the frame after moulding. This contraction frequently results in a buckling or distortion of the metal mesh which produces subsequent problems in the applying of the paste to the mesh, and particularly in regard to the promoting of the flow of the paste material through the openings of the mesh.

It is therefore the object of the present invention to provide a method of manufacturing battery plates for the above general construction which overcomes the problem of buckling of the mesh.

With this object in view there is provided a method of manufacturing a battery plate having a metal mesh element disposed within a moulded plastic frame with at least a portion of the mesh element embedded in the frame including the step of, forming in the exposed portion of the mesh after the frame has been moulded an array of depressions and/or projections to stretch the mesh and increase the nominal thickness of the mesh element.

By the term 'nominal thickness of the mesh element' it is meant the thickness measured across the peaks of the projections on opposite sides of the mesh. If the peaks are not of a uniform height then the nominal thickness is measured across the mean height of the peaks on the opposite sides of the mesh element.

Preferably the exposed portion of the mesh element is subjected to a rolling or pressing operation to form the depressions and/or projections therein. Conveniently the forming of the mesh element provides projections on one side of the element and complementary depressions on the opposite side.

In the preferred form the mesh element is subjected to a forming operation that imparts a corrugated shape to the exposed portion thereof thus forming a series of alternate valleys and ridges when viewed from either side. The corrugations may be conveniently formed by a rolling operation.

The stretching of the mesh element resulting from the formation of the depressions and/or projections removes any buckling of the mesh element that may have developed as a result of expansion and contraction during moulding of the frame about the mesh element. The forming of the projections and/or depressions may be controlled relative to the plane of the frame so that after the forming operation the mesh is accurately positioned relative to the plane of the frame, and may thus be readily pasted with active paste material.

In one preferred form there is provided a battery plate frame moulded from theremoplastic material having a plurality of division elements disposed parallel to two opposite sides of the frame to form within the frame a plurality of side by side paste receiving areas, each battery paste receiving area having a metal mesh element spanning the area and embedded during moulding of the frame into portions of the frame forming at least two opposite sides of the paste receiving area, each mesh element having an array of depressions and/or projections formed therein after moulding of the frame to stretch the mesh element and increase the nominal thickness thereof.

Preferably each mesh element is formed into a corrugated shape, conveniently by a rolling operation.

The corrugations may be applied to the mesh elements of a frame having a plurality of side by side paste areas as described above by passing the frames through a pair of rollers. The rollers have peripheral surfaces contoured to apply the required corrugations to the mesh element, and have circumferential grooves through which the opposite sides of the frame and the divisions therein pass so that they are not subjected to the corrugating action. Suitable sensor devices are provided to open and close the rolls in sequence with the movement of the frames therethrough so that the end portions of the frame, which are parallel to the axes of rollers as the frames pass therethrough, are also not subjected to the corrugating action of the rollers.

This invention will be more readily understood from the following description of one practical arrangement of the battery plate frame and of the apparatus for forming corrugations in the mesh of the frames as illustrated in the accompanying drawings.

Figure 1:
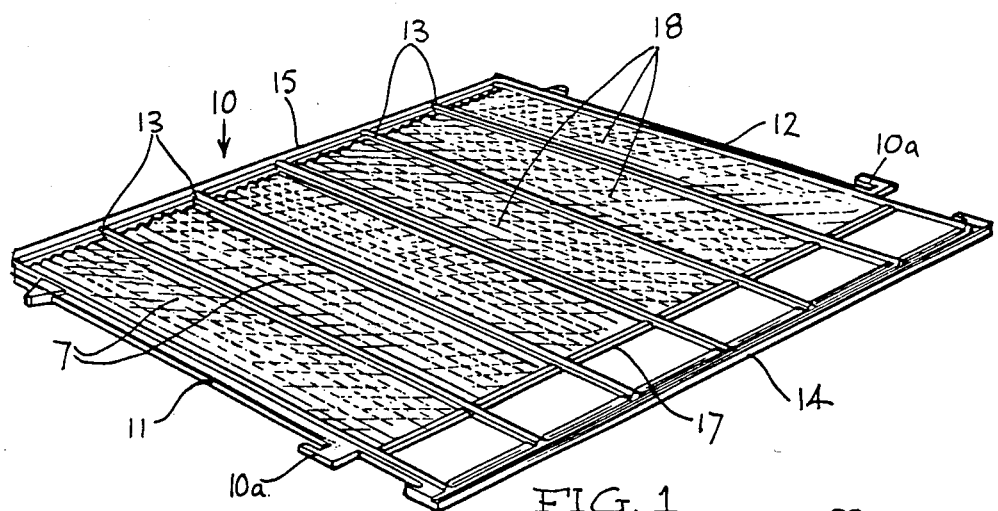
FIG. 1 is a perspective view of a battery frame.

Referring now to FIG. 1 of the drawings the frame 10 comprises a boundary frame having opposite side members 11 and 12, five divisional elements 13 parallel to the side members and spaced equally to form six paste receiving areas 7 of equal width. The boundary frame also has an upper and lower end member 14 and 15 respectively and a paste area upper member 17, each parallel and extending between the side members 11 and 12.

Each paste receiving area 7 has a metal mesh element 18 spanning the area fully and embedded along its periphery in the adjoining portions of the frame. The frame is produced by locating the mesh elements in a mould and forming the frame 10 by moulding thermoplastic material in-situ on the mesh element.

The frame shown in FIG. 1 is specifically designed for use in a battery of the construction disclosed in U.S. Pat. Nos. 3,941,615 and 4,022,951. In the frames for this battery the mesh elements extend through selected division elements 13 of the frame, however, this fact is irrelevant to the present invention. It is however to be understood that the present invention is applicable to other frame constructions for use in other types of batteries where a plastic frame is moulded in-situ on a metallic mesh element that is intended for supporting battery paste material.

Figure 2:
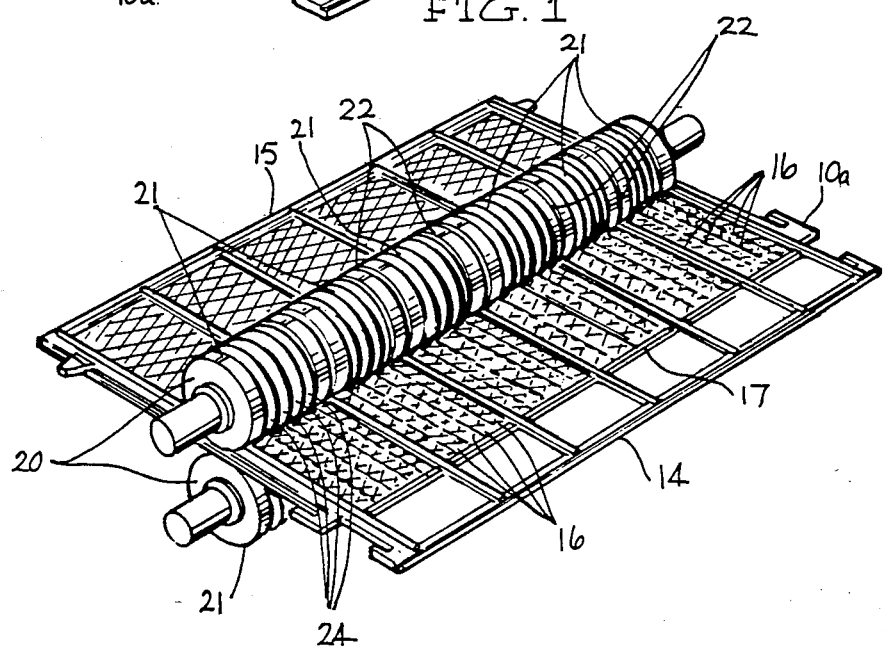
FIG. 2 is a fragmental cross-sectional view of a portion of the frame shown in FIG. 1 and of the pair of rollers used to corrugate the mesh elements of the frame.

As seen in FIG. 2 each mesh element may have a series of alternating depressions and projections applied thereto forming corrugations 16 that extend parallel to the sides 11 and 12 and division elements 13 of the frame. These corrugations are formed by passing the frame through the pair of rollers 20, shown in FIG. 2 which are part of the machine shown in FIG. 3.

The rollers of the pair of rollers 20 each has six axially spaced sections 21 which define annular recesses 22 therebetween. The centre distance between the annular recess 22 is equal to the spacing of the divisional elements 13 of the frames. The width and depth of the recesses is also such that when the rollers are in the operative position, applying the corrugations to the mesh-elements 18, the division members 13 are freely received in the recesses and no radial pressure is applied to the division members 13.

Each section 21 of each roller 20 has a plurality of peripheral ridges 24 with grooves therebetween. The ridges 24 on the upper roller are off-set with respect to the ridges in the lower roller so that in use they interfit. The axes of the upper and lower rollers are spaced in use so the gap between the complementary faces of the interfitting ridges 24 is substantially equal to the thickness of the mesh elements.

The mesh elements 18 are initially made flat, as shown in FIG. 1, and of a width and length to span the respective receiving areas 7 with the marginal portion on each edge embedded in the frame. The subsequent applying of corrugates to the mesh elements increases the total length of the mesh element measured in the direction transverse to the corrugations. This increase is achieved by a stretching of the mesh element by the action of the corrugating rollers.

Accordingly if there is any irregular distortion of the mesh elements during production of the frames the corrugation applied by the rollers will relocate the irregular distortion into the regular corrugations. Also the action of the corrugating rollers will accurately locate the plane of the mesh elements relative to the central plane of the frame.

The height of the corrugation is preferably less than the thickness of the boundary frame and division elements of the frame so that the crests of the corrugation are within the paste material of the battery plates when the frames are pasted.

Figure 3:
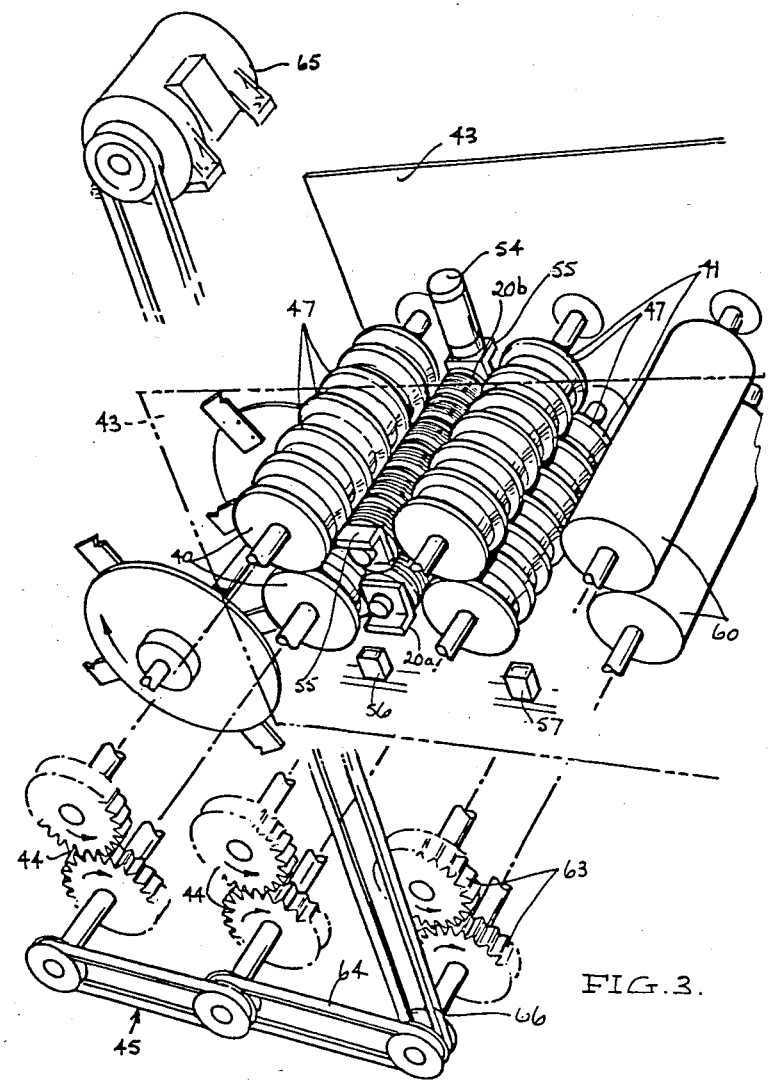
FIG. 3 is a perspective view partly in section of the machine used to apply the corrugations to the mesh element of the frame shown in FIG. 1.

Referring now to FIG. 3 of the drawings the machine for corrugating the mesh elements of the frame, comprises two pairs of feed rollers 40 and 41 with the pair of corrugating rollers 20. The rollers of each pair of feed rollers are supported in bearings mounted on the support structure 43. The rollers of each pair are drive coupled by a respective gear train 44 and one roller of each pair is coupled by a belt and pulley drive 45. Accordingly all feed rollers rotate in unison and as the gear trains have a one-to-one ratio all feed rollers rotate at the same speed.

Each roller of each pair of feed rollers has seven peripheral ridges 47 spaced axially to engage the frame side members 11 and 12 and divsion elements 13. Thus the frames are fed through the machine by the engagement of the feed rollers with only the side members and division elements.

The construction of the corrugating rollers 20 has previously been described with reference to FIG. 2. The lower corrugating roller 20a is mounted on a fixed horizontal axis in bearing mounted on the support structure 43. The upper corrugating roller 20b is mounted for raising and lowering movement relative to lower roller 20a to open and close the corrugating rollers. The vertical movement of the upper corrugation roller is controlled by a pair of pneumatic cylinders 54 (only one shown) connected between the support structure and the upper roller bearings 55. The pneumatic cylinders 54 are operated to move the roller 20b in controlled timing with the movement of the frames 10 between the rollers.

The operation of the cylinders 54 are controlled by the sensors 56 and 57 mounted on the support structure 43 along the path of movement of the frames 10 through the feed rollers. The sensors 56 and 57 are arranged to be activated by one of the lugs 10a provided on the opposite sides of the frame 10.

As the upper and lower members 14 and 15, and the paste area upper member 17 would be seriously damaged if subjected to the action of the corrugating rollers 20 in the manner applied to the mesh element 18. The corrugating rollers are therefore spaced apart vertically to permit the upper member 14 and paste area upper members 17 to pass freely therebetween as the frame 10 advances through the machine.

The sensor 56 is activated by the lug 10a when the paste area upper member has passed through the rollers 20 to operate the pneumatic cylinders 54 and lower the upper rollers 20b onto the mesh elements 18 of the frame. The rollers remain in this position until the lower member 15 of the frame is about to enter between the roller 20, at which point the lug 10a activates the sensor 57 to operate the cylinders 54 to raise the upper corrugating roller 20b. The lower member 15 of the frame then passes the rollers and the rollers remain open until the lug 10a of the next frame activates the sensor 56 after the upper member 14 and paste area upper member 17 of that frame has passed through the rollers. The cylinders 54 then lower the roller 20b to effect corrugating of the mesh elements.

A pair of flattening rollers 60 are supported by bearing 61 carried by the support structure 43 are located spaced from the feed rollers 41 through which the frames leave the corrugating rollers. The rollers 60 are drive coupled by the gear train 63 and coupled by a belt and pulley drive 64 to the rollers 41. The electric motor 65 is coupled by the belt and pulley drive 66 to the flattening rollers 60, and thus the motor 65 drives both pairs of feed rollers 40 and 41 and the flattening rollers 60.

The flattening rollers 60 have plain cylindrical surfaces and are provided to counter the tendency of the frames to curve in the longitudinal direction induced by the feed rollers.

The machine described with reference to the drawing incorporates rollers specifically designed for use with the battery paste support frame as illustrated in FIG. 1 but it is to be understood that suitable corrugating rollers and feed rollers to suit other paste support frames. Also it should be understood that plain cylindrical feed roller could be used as a substitute for the feed roller 40 and 41.

The claims defining the invention are as follows:

1. A method of manufacturing a battery grid having a plurality of side by side rectangular paste receiving areas each having a metal mesh element supported therein, said method comprising moulding a plastic rectangular perimeter frame with a plurality of integral division elements located parallel to opposite sides of the perimeter frame to define between said opposite sides said side by side rectangular paste receiving areas, embedding during moulding of the frame at least a portion of the mesh element in one of said opposite sides of the frame and in at least one adjacent division element so the mesh element spans the paste receiving area, and thereafter forming in the exposed portion of each mesh element at least one corrugation extending parallel to the division elements so that the mesh element is stretched to remove any buckling thereof occurring during moulding of the frame thereabout.

2. A method as claimed in claim 1 wherein said corrugation is formed by a rolling operation.

3. A method as claimed in claims 1 or 2 wherein the corrugation in the mesh element forms a projection on one side of the element and a complementary depression on the opposite side of said element.

4. A method as claimed in claim 1 or 2 wherein a plurality of parallel corrugations are formed in the exposed portion of the mesh.

* * * * *